United States Patent [19]
Uomini

[11] Patent Number: 5,819,269
[45] Date of Patent: Oct. 6, 1998

[54] DYNAMIC SUBGROUPING IN A NEWS NETWORK

[75] Inventor: Robert Uomini, Kensington, Calif.

[73] Assignees: Robert G. Uomini; Louise B. Bidwell Trust, both of Kensington, Calif.

[21] Appl. No.: 667,567

[22] Filed: Jun. 21, 1996

[51] Int. Cl.$^6$ ...................................................... G06F 17/30
[52] U.S. Cl. ..................... 707/7; 707/1; 707/10
[58] Field of Search ................................... 395/607, 610; 707/1, 7, 10

[56] References Cited

U.S. PATENT DOCUMENTS

| | | | |
|---|---|---|---|
| 5,095,480 | 3/1992 | Fenner | 370/238 |
| 5,544,360 | 8/1996 | Lewak | 707/1 |
| 5,548,753 | 8/1996 | Linstead | 707/1 |
| 5,572,643 | 11/1996 | Judson | 395/200.48 |
| 5,617,565 | 4/1997 | Augenbraun | 707/4 |
| 5,619,648 | 4/1997 | Canale | 395/200.36 |
| 5,649,186 | 7/1997 | Ferguson | 707/10 |

OTHER PUBLICATIONS

Network Working Group, Standard for Interchange of USENET Messages, by M. Horton, At&T Bell Laboratories, pp. 1–19, Dec. 1987.

"Request for Comments 1036", Dec. 1987 Located at http://www.pmg.lcs.mit.edu/cgi–bin/rfc/view?number=1036.

Greg Woods, "How to Create a New Usenet Newsgroup," http://www.cis.ohio–state.edu/hype . . . creating–newsgroups/part1/fag.html, Jun. 13, 1996, pp. 1–3.

*Primary Examiner*—Thomas G. Black
*Assistant Examiner*—Diane D. Mizrahi
*Attorney, Agent, or Firm*—Philip H. Albert; Townsend and Townsend and Crew

[57] ABSTRACT

An apparatus and method for dynamically subgrouping messages in a news network is provided to assist posters and readers in the news network. Each message can be assigned one or more categories as well as being assigned one or more conventional newsgroup labels. Categories can have a hierarchical structure of categories and subcategories. Categories can be filtered and/or sorted by the reader and categories can be applicable to many different groups or specific to a group. The categories are not limited to any predefined list, but can be specified by the poster.

12 Claims, 5 Drawing Sheets

18

34 { To: programming-list@fractals.fractals.com
32 { X-Article-Category: Java ports:Questions
From: uomini@fractals.fractals.com
Subject: Can I run Java scripts on a Linux Machine?
Content-Type: text
Content-Length: 162
Message ID: <DnwMG5.7GK@msg.fractal.com>
Organization: The Fractal Images Company
30 { Date: Thu, 7 Mar 1996 15:45:40 GMT I have looked but I can't find any reference to a Java script interpreter which
runs under Linux. Does anyone know if one exists?

--
Robert Uomini
Programmer

Fig. 2

DYNAMIC SUBGROUPING IN A NEWS NETWORK

BACKGROUND OF THE INVENTION

The present invention relates to network news and more particularly to a system for dynamically subgrouping postings within newsgroups.

A popular feature of many online networking systems is a news network, which is a collection of messages on various topics. In a news network, most users can both read existing messages and post new messages. In order that a user can limit his or her reading time to only those messages of interest, the messages in the news network are divided into newsgroups. A poster (a user who posts a message) will include an indication of the newsgroup with the message being posted, and a reader (a user who reads messages) will select only those newsgroups which interest the reader.

Arguably, the most expansive news network is the Usenet news network. Usenet exists by cooperative agreement among the individual news servers, often referred to as News Network Transport Protocol (NNTP servers), operated more or less independently of each other. To have access to Usenet, a user must have access to an NNTP server. The poster's NNTP server maintains a list of valid newsgroups and maintains a database of messages. To post a message, the poster sends the message, along with an indication of the one or more newsgroups to which the message is to be posted, to the poster's NNTP server. An exemplary partial listing of a valid newsgroup list is shown in Table 1. On some Unix systems, this list is stored as the file "/usr/lib/news/active".

Table 1. Newsgroup List comp.archives.msdos.announce
comp.databases
comp.databases.informix
comp.databases.theory
comp.databases.xbase.fox
comp.databases.xbase.misc
misc.activism.progressive
misc.answers
misc.books.technical
misc.consumers
misc.consumers.house
misc.creativity
misc.education
misc.education.adult
misc.education.language.english
misc.forsale
misc.forsale.computers.other
misc.forsale.computers
misc.forsale.computers.d
misc.forsale.computers.mac
rec.bicycling
rec.bicycling.tours
sci.agriculture
sci.agriculture.beekeeping
sci.answers
sci.astro
sci.astro.fits
sci.astro.hubble
sci.astro.planetarium
sci.astro.research As Table 1 shows, the newsgroups form a hierarchy running from broad topics on the left (e.g., "comp." for computer science, "misc." for miscellaneous, and "sci." for science) to more specific topics following the broader topics, separated by periods. For example, the newsgroup sci.astro is for the discussion of the science of astronomy, whereas the newsgroup sci.astro.hubble is specifically for discussion of astronomy involving the Hubble telescope.

The messages are usually stored on the NNTP server in a similar fashion. One organization is using a hierarchical directory structure. In such a directory structure, a directory named "sci" created with subdirectories "answers", "astro", etc. included therein, so that one directory exists for each newsgroup. The directory for a given newsgroup can be easily found, as its name corresponds to the name of the newsgroup (i.e., sci.astro might have a directory of "/usr/spool/news/sci/astro" in a Unix system). All the messages for that newsgroup are then stored in the directory for that newsgroup. Alternatively, the messages (or references thereto) are stored in a database which has a hierarchical structure mirroring the NNTP server's list of valid newsgroups). Together with the messages themselves and the list of valid newsgroups, an NNTP server maintains a table indicating the storage limits of each newsgroup. In an exemplary usage of such a table, it might indicate that for an announcement newsgroup, messages are deleted after two weeks, for a graphics newsgroup old messages are deleted when new messages cause the newsgroup's total storage to exceed twenty megabytes of storage, for a busy discussion newsgroup, only the most recent four hundred messages are kept and for an archival newsgroup, all messages are kept.

In practice, not all newsgroups and not all messages are stored by a given NNTP server. For example, a research organization operating an NNTP server for its members might choose not to include the newsgroups rec.games.computer and the like. Also, most NNTP servers limit the number of messages in a group by removing (expiring) old messages as explained above. An NNTP server periodically deletes expired messages and also periodically contacts other NNTP servers to obtain more messages originating elsewhere, exchanging messages with each NNTP server it meets. When two NNTP servers meet to exchange messages, each server identifies which newsgroups it is interested in and which messages it has. From this information, each NNTP server determines which messages it doesn't have, but wants, and requests those messages from the other NNTP server. In this way, the poster's message propagates from the poster's NNTP server to its nearest neighbors, which then propagate it, until the poster's message reaches all NNTP servers in the Usenet news network which have a communication path, directly or indirectly, to the poster's NNTP server. These processes are well known and are described in further detail in various documents known as RFCs (Requests For Comments), such as RFCs 850, 977 and 822. The RFCs are archived references widely available on the Internet and are incorporated by reference herein for all purposes.

Once the messages have had a chance to propagate through the Usenet news network, a reader (which be either a person or a computer operating according to its programming) can obtain those messages from the reader's NNTP server. If the NNTP server does not carry a particular newsgroup, it does not accept messages for that newsgroup and the reader cannot read messages in that newsgroup, unless the reader connected to a different NNTP server. Not all messages are retrieved for reading, which is useful if the reader is only interested in a few dozen newsgroups. According to current estimates, there are over 10,000 newsgroups on a typical NNTP server. The reader limits newsgroup reading by way of a subscription list. The subscription list is a subset of the valid newsgroups list which are maintained by the reader's NNTP server and the subscription list is typically customized to the reader.

While the operation of a news network such as Usenet is quite involved, it is further complicated by the capability of adding and deleting newsgroups. If, during an ongoing discussion in the newsgroup sci.astro.hubble, one or more readers of the newsgroup decides that the amount of discussion relating to the politics of the funding the Hubble telescope, as opposed to the astronomical research performed with it, is sufficient, voluminous and continuing enough to justify its own group, those readers might set out to create a new newsgroup, such as sci.astro.hubble.politics.

Setting up a new newsgroup is not trivial, and for good reason. If anyone could set up a new newsgroup on a whim, many silly, worthless and/or empty newsgroups would be formed and many NNTP servers would be expending their processing power arranging and rearranging the hierarchical newsgroup structures and messages and users would be continually swamped with new newsgroups to chose from. The problem was apparent in the early days of the explosion of interest in the Internet in the early 1990's, when a person would discover Usenet and create entire hierarchies of hundreds of topics of interest to that person. Each time a reader would connect to their NNTP server, they would be faced with having delete all these new newsgroups from their subscription list, if the their NNTP server automatically subscribes them to new newsgroups, or wade through a long series of questions asking whether the reader wished to subscribe.

Customary procedures for adding or deleting newsgroups have developed among Usenet users. These procedures include calls for a request for discussion, a call for votes, balloting and other steps. Because the minimum voting period is 21 days, a new newsgroup cannot be formed in less time. Of course, an operator of an NNTP server can ignore those procedures and modify its own newsgroup structure, but the modifications would not likely be imposed by fiat on all the other NNTP servers, as the other NNTP servers would likely ignore any newsgroup changes which were propagated without following the customary procedures.

Once a properly formed newsgroup is created, it is propagated through Usenet and may persist even though no messages are posted to that newsgroup. Because of the time and effort required to add or delete newsgroups, messages tend to be "undercategorized" in some cases, in that large numbers of messages on similar, but differentiable, topics are lumped into a single newsgroup or "undercatagorized" in that many newsgroups have too few messages to justify the continued existence of the newsgroup. News reading programs in the past have had a capability to filter messages by other than newsgroups. For example, a reader could specify a regular expression and have a news reading program display only the messages containing the specified regular expression. The regular expression could specify a message header which must be found, such as "From: uomini@fractals.fractals.com." While such regular expression filtering may be useful, it generally does not provide for message grouping. Messages can also be handled by reference fields, but those field do not allow for subgroups to be refined over time.

In view of the failings of the prior art, what is needed is a system for dynamically subgrouping messages based on the messages themselves.

SUMMARY OF THE INVENTION

The present invention provides an apparatus and method for dynamically subgrouping messages in a news network. In one embodiment, subgroups are referred to as "categories" and each message can be assigned one or more categories as well as being assigned one or more conventional newsgroup label. Categories can themselves have a hierarchical structure of categories and subcategories. Categories can be filtered and/or sorted by the reader and categories can be applicable to many different groups (e.g., "basic questions", "advanced questions", "product announcements") or specific to a group (e.g. categories for specific trails in rec.bicycling). The categories are not limited to any predefined list, but can be specified by the poster. Of course, for intelligent categorization, the poster will use a category which is understood and/or used by other readers of the newsgroup to which the categorized message is posted.

A further understanding of the nature and advantages of the inventions herein may be realized by reference to the remaining portions of the specification and the attached drawings.

BRIEF DESCRIPTION OF THE DRAWINGS

FIG. 2 is an illustration of an exemplary posted message specifying a message category and subcategory.

DESCRIPTION OF THE PREFERRED EMBODIMENT

While the present invention is not limited to Usenet-type news networks or distributed networks, generally the preferred embodiments will be described with reference to the Usenet news network. In this description, the news servers will be assumed to be NNTP (network news transport protocol) servers although, as is well known in the art, non-NNTP servers can serve news traffic. The present invention could, but need not be used in conjunction with the invention described in U.S. patent application Ser. No. 08/615,483, filed on Mar. 15, 1996, entitled DISTRIBUTED POSTING SYSTEM USING AN INDIRECT REFERENCE PROTOCOL which is incorporated herein for all purposes.

Figure 1:
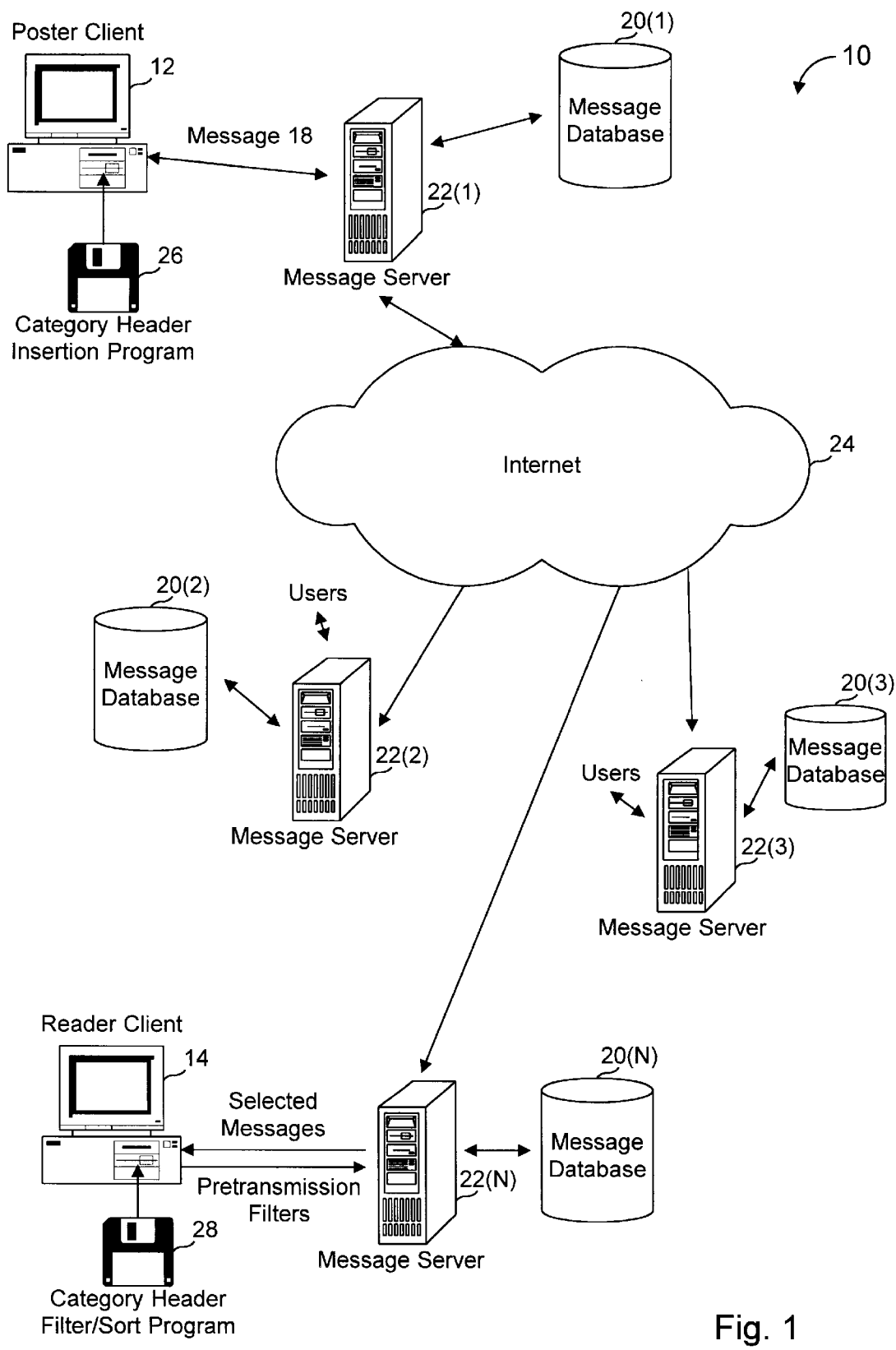
FIG. 1 is a block diagram of a news network.

FIG. 1 is a logical block diagram of the major elements of a news network 10. News network 10 operates to transport messages posted by a poster client 12 to a reader client 14, via an NNTP server 22(1), the Internet 24, and another NNTP server 22(N). As used herein, like numbers designate like items and parenthetical numbers indicate different instantiations of such like items (i.e., NNTP servers 22(1) ... 22(N) are all NNTP servers, but N different ones). Where a parenthetical number is omitted, the reference is to one, several or all like numbered items, depending on context.

FIG. 1 is not the only possible arrangement of systems for use with the present invention and many others are apparent upon reading the description herein. For example, as is well known in the art of news transport, Internet 24 might interposed as shown in FIG. 1, but might also be interposed between poster client 12 and NNTP server 22(1) and/or between reader client 14 and NNTP server 22(N). Furthermore, an Internet Service Provider (ISP) system might be interposed between a client 12, 14 and an NNTP server 22. Users of other NNTP servers 22(2), 22(3) are not shown, but are implied.

As explained in connection with later figures, poster client 12 includes programming 26 to allow for entry of one or more category and subcategories. Of course, subcategories are not required and categories can also be made optional. If desired, the poster includes a category selection to associate with message 18. Message 18 is transported through news network 10 and can be filtered or sorted along with other messages based on the category by reader client 14 programmed according to programming 28. Message 18 is stored along with other messages in a news database 20 associated with each NNTP server 22. AS explained above, each NNTP server 22 might not have a copy of each message, as some messages might not have completed propagation through news network 10 and some messages might be in newsgroups not carried by every NNTP server 22.

Programming 26 and 28 are shown in FIG. 1 as removable media. However, it should be apparent from this description that programming 26 and 28 can be provided to their respective clients 12, 14 in any number of ways, such as transmission by modem or over a network connection to a file server or the Internet, or by original installation onto the client when sold. Furthermore, it should be apparent from this description and FIG. 1 that poster client 12 and reader client 14 could have their functionality combined into a single machine connected to a single NNTP server 22. This is a common configuration, as many Usenet users can both read and post messages to newsgroups. In most cases, a user can post a message in response to a prior message. A common arrangement of posters and servers is where one user uses a personal computer with a permanent or on-demand connection to the user's Internet Service Provider (ISP) for reading and posting news messages to Usenet.

To initiate the process of posting message 18, poster client 12 creates a file containing header lines followed by a message body. FIG. 2 shows the contents of such a file. In Usenet message files, the convention is for the header lines to be at the top of the file, separated from the message body by a blank line. Each header line contains a header line type as the first "word" on the line, followed by a colon, a space, and the value for that header line. For example, message 18 has a "Date" header 30 which has a value of "Thu, 7 Mar 1996 15:$5:40 GMT" indicating when the message was sent. As shown in FIG. 2, message 18 also contains a category header 32 and a newsgroup header 34. Category header 32 identifies the message's category ("X-Article-Category") within the newsgroup identified by newsgroup header 34. As used herein, the terms "message" and "article" are interchangeable. Category header 32 which identifies "Java ports" as the category and "Questions" as the subcategory of the message. The category is delimited from the subcategory by a colon, but other delimiting schemes might be used instead. It should be understood that wherever a category can be used, a category followed by one or more subcategories of increasing specificity can be used. With the particular category header in message 18, a reader can filter out this message if the reader has no interest in Java ports even if the user is subscribed to the comp.programming.java newsgroup. Of course, if the reader is subscribed to the comp.programming.java newsgroup and is interested in Java ports, but is not interested in Questions, the reader would filter in that category, but filter out the Questions subcategory. If two or more categories are to be specified, set out in one message header line separated by commas, or on separate message header lines, each with the same message header tag.

Figure 3:
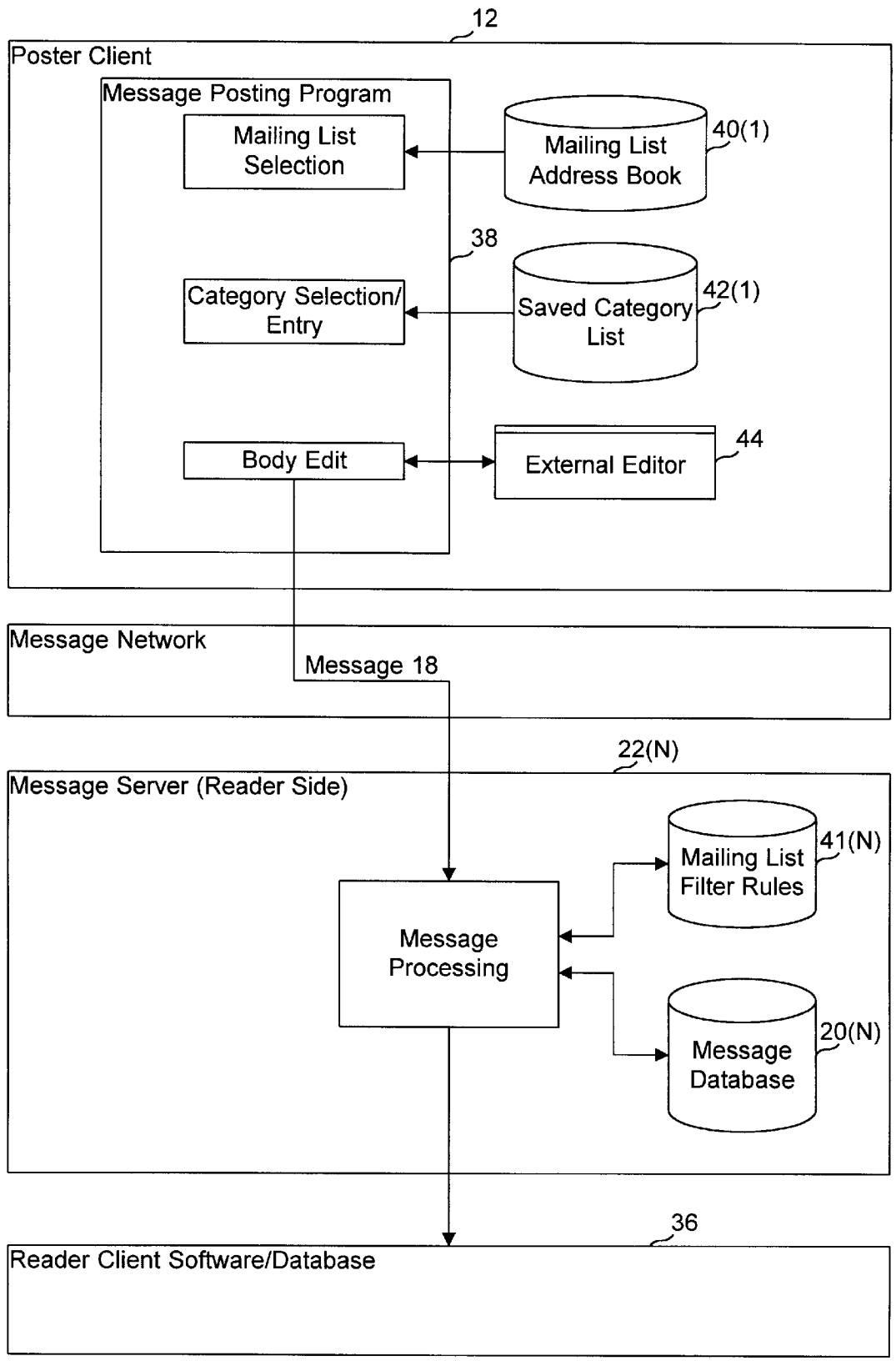
FIG. 3 is a block diagram of the software and database elements of the news network shown in FIG. 1.

Message 18 is created using the systems shown in FIG. 3. As shown in FIG. 3, poster client 12 includes a news posting program 38, a newsgroup list 40(1), a saved category list 42(1) and an external editor 44. News posting program 38 is shown including a newsgroup selection module, a category selection/entry module and a message body edit module. As is well known in the art, the message body edit module can have its own internal editor for use in place of external editor 44.

In an actual implementation, the modules of poster client 12 might be more integrated than shown in FIG. 3. However implemented, poster client 12 allows for a poster (human user or computer program) to create message 18 (see FIG. 2) with a newsgroup indication, a category indication and a message body. The newsgroup indication of the message is selected by the user, either by the user entering one or more newsgroups and having the entered newsgroups validated against newsgroup list 40(1) or by presenting a pick list to the poster. In a typical implementation, the category selection/entry module presents the poster with a list of existing categories. However, unlike the newsgroup entry, the categories available to the poster are not limited to some officially generated list of categories (although such a restraint might be appropriate for some newsgroups). Instead, the poster can select from the categories in the saved category list 42(1) or enter a new category. Preferably, the poster will use an existing category if an appropriate one exists and will only create a new category when justified. Although not required, the newly entered category is stored in saved category list 42(1).

Once constructed, poster client 12 sends message 18 through the NNTP news network to the NNTP server 22 (N) on the reader side. NNTP server 22(N) is a conventional NNTP server and is shown with a newsgroup list 40(N) and a news database 20(N). Newsgroup list 40(N) is a listing of the newsgroups carried by NNTP server 22(N) as explained above, and news database 20(N) is the data structure which holds all the news articles, organized by newsgroup, until requested by reader clients. No extra database is needed to track categories, although one could be added, since the categories are included within each message and the categories need not comply with the same restraints that newsgroups do.

Figure 4:
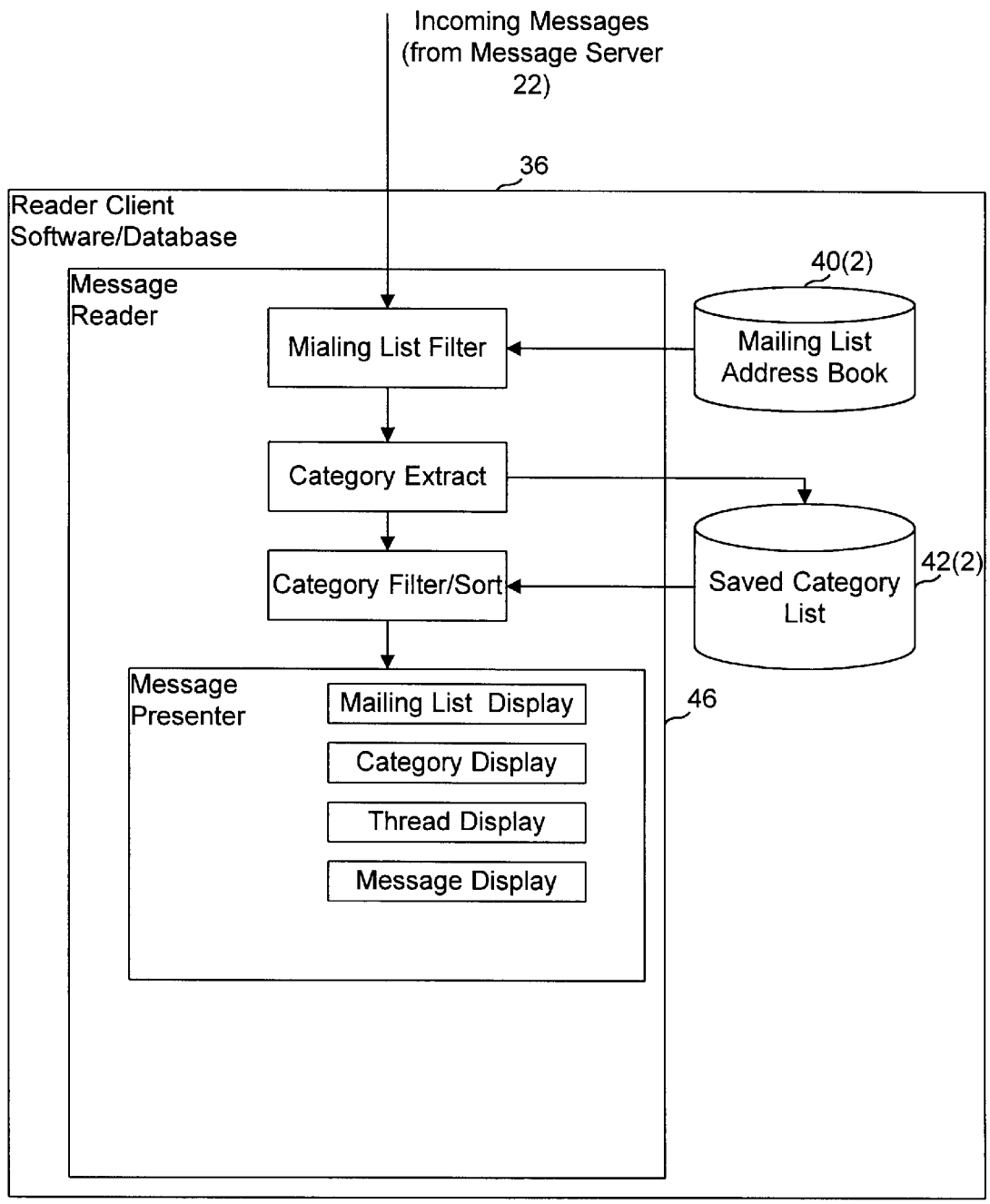
FIG. 4 is a more detailed block diagram of the software and database elements of the reader client shown in FIG. 3.

Message 18, and other messages, are read from NNTP server 22 (which could be NNTP server 22(N) shown in FIG. 3 or any other NNTP server) by a reader client 36. Reader client 36 is shown in greater detail in FIG. 4, and includes its own newsgroup list 40(2) along with a saved category list 42(2) and a news reader program 46. News reader program 46 is shown including modules for filtering newsgroups, extracting categories, filtering and sorting categories, as well as a message presenter which presents messages organized by newsgroup, category, thread and message.

As messages are received by reader 36 from NNTP server 22, they are filtered to ignore messages for newsgroups not found in newsgroup list 40(2). Preferably, if the connection between NNTP server 22 and reader client 36 is bandwidth limited, reader client 36 indicates ahead of time to NNTP server 22 which newsgroups it wants or doesn't want, so that unwanted messages are not sent. Newsgroup list 40(2) is similar in structure to newsgroup lists 40(1) and 40(N) shown in FIG. 3, but it should be apparent from this description that they can contain different selections of newsgroups.

Once the messages are filtered for newsgroups, if needed, news reader program 46 reads the category from each message. If the category is one that is not listed in category list 42(2) for the newsgroup(s) specified in the message, it is added to category list 42(2). This, of course, is optional in that a poster could be configured to disallow for the automatic addition of newly found categories. Because category list 42(2) is subject to the preferences of the reader and the messages received by that reader, category list 42(2) will likely be different than category list 42(1) used by poster client 12 (see FIG. 3). However, the structures of each category list is preferably the same. One such structure is a hierarchy of newsgroups and a hierarchy of categories (and subcategories) attached to particular newsgroups. Another structure, which might be appropriate in some situations is a structure of categories and subcategories which is not specific to any particular newsgroup, or single category/ subcategory structure which is duplicated for multiple newsgroups.

In the preferred embodiment, category list 42(2) also includes indications of which categories are of interest, so that the messages having category indications equal to the categories of interest can be highlighted upon display. Alternatively, the messages in categories of no interest to the reader can be deleted according to a "kill list". Other functions, such as copying messages in selected categories to a file, or other processing might also be included.

Once the messages are filtered, they can be sorted into category order within each newsgroup, allowing the message presenter to present a list of newsgroups from which the reader would select a newsgroup, present a category list for the selected newsgroup, and then present the threads within the selected categories and the messages of that thread. Not all levels of ordering need be present. For example, presenting order could be by newsgroup, category and then all messages within the category. Threads are a well known method of message presentation, where messages are grouped by subject header or placed in a hierarchy based on a "references" header.

Figure 5:
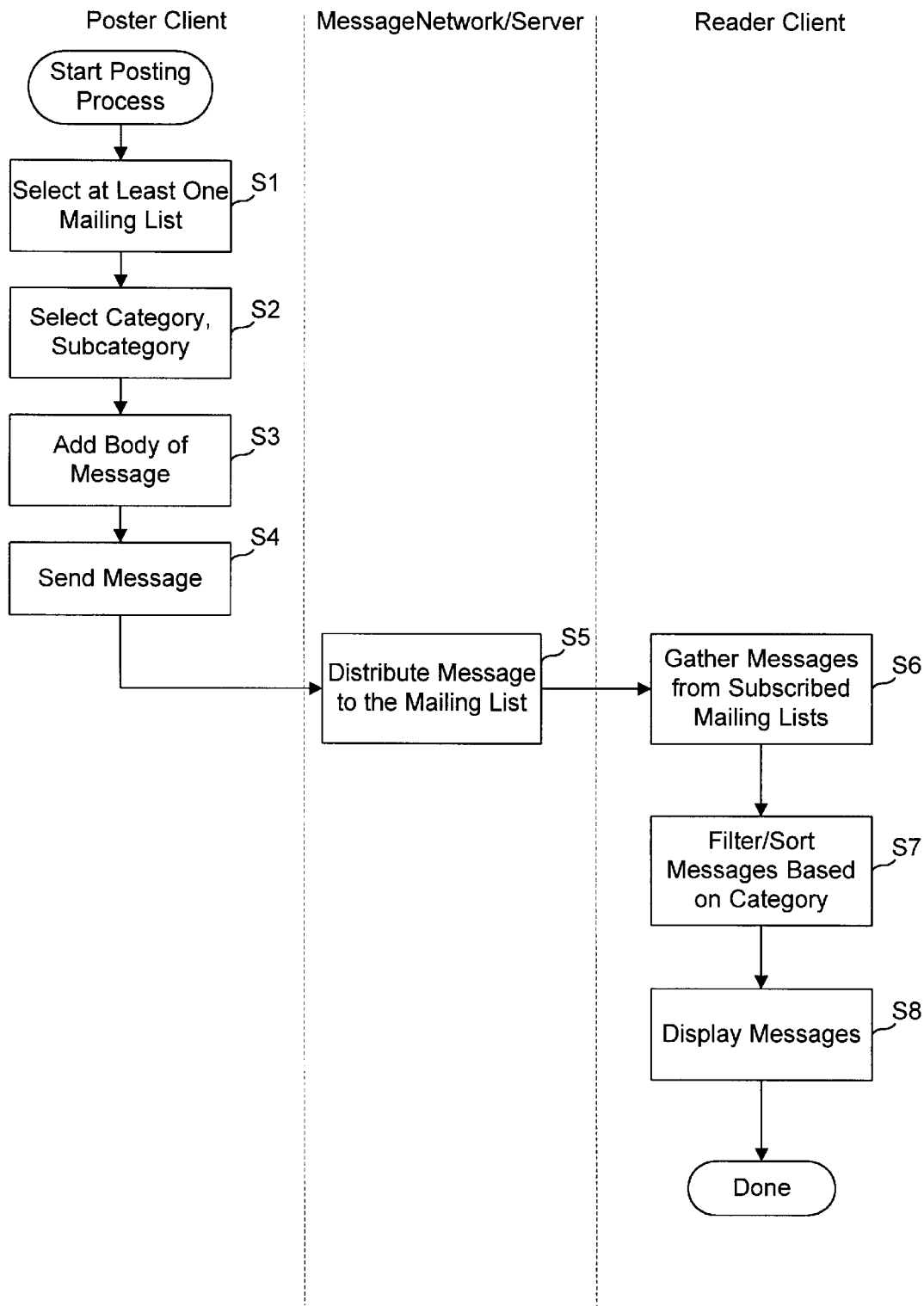
FIG. 5 is a flowchart of a method of posting and reading messages which use message categories.

Referring now to FIG. 5, a flowchart of a news posting and reading operation using categories for message handling is shown. The steps of the flowchart, numbered from S1 to S9 are performed in numerical sequence, except where noted. In step S1, the poster selects at least one newsgroup for a message. As is well known in the art, a poster can "cross-post" by selecting more than one newsgroup. If the message is in reply to a prior posting, the default newsgroups might be preselected from the newsgroup header of the prior posting.

In step S2, the poster selects a category and one or more subcategories where appropriate. These can be from a predefined list or freehand entry by the poster where appropriate. In step S3, the body of the message is added. As should be apparent, an alternative order is to create the body before the selections in steps S1, S2, or to create them all at once. Many news message editors allow for editing of the message headers and the message body as an integrated file.

However created, the message is then posted (Step S4) to the NNTP network. The NNTP server to which it is first posted will, preferably, check the validity (S5) of the selected newsgroups and reject the message back to the poster if the newsgroup is not one known to the NNTP server. If the newsgroups are known to the NNTP server, the NNTP server distributes the message (S6) to other NNTP servers in the news network. From one of these NNTP servers, the reader client gathers messages from subscribed newsgroups (S7), filters and sorts the messages by category (S8) and displays or otherwise processes the messages (S9).

In summary, the above description describes apparatus and methods for making and using a news network system which includes message categories in messages. Categories, unlike newsgroups, allow for flexible, dynamic categorization of messages to provide readers with a mechanism for organizing received messages and for posters to get their messages to interested readers.

The above description is illustrative and not restrictive. Many variations of the invention will become apparent to those of skill in the art upon review of this disclosure. For example, although separate servers are shown in FIG. 1, the functionality of several separate servers might be combined into a single server. Furthermore, the Internet need not actually be interposed between the poster and the reader, as both might be connected directly to a common ISP, or might be connected to an internal network. As yet another variation, the categories can be used for dynamic grouping unrelated to the contents of the message. For example, categories can be used to indicate the geographic location of the poster. Such categorization would be useful in a newsgroup such as rec.social . . . where readers might want to limit messages by region. Thus, a poster's could include a header line such as "X-Article-Category:US:CA:San Francisco" to indicate the poster's location. By filtering/sorting by category, a reader can limit his or her reading to messages from a specific area. The scope of the invention should, therefore, be determined not with reference to the above description, but instead should be determined with reference to the appended claims along with their full scope of equivalents.

What is claimed is:

1. A method of dynamically grouping messages in a news network, the method comprising the steps of:
   assigning a category designation to the message, the category designation being a designation not limited to an enumerated list of category designations;
   including at least one group designation and the category designation in the message; and
   posting the message to a news server.

2. The method of claim 1, further comprising the steps of:
   receiving messages from a news server using a reader client; and
   filtering messages based on a set of category filters.

3. The method of claim 1, wherein the step of assigning a category designation further comprises a step of assigning at least one subcategory designation, where appropriate, to the message.

4. The method of claim 1, wherein the step of assigning a category designation further comprises the steps of:
   selecting a source of the category designation, the source selected from at least a predetermined list of category designations and a freeform category entry source;
   when the predetermined list of category designations is the source selected, selecting a category designation from the predetermined list; and
   when the source is the freeform category entry source, accepting an input representation of the category designation unconstrained by an enumerated list of categories.

5. The method of claim 4, further comprising a step of compiling the predetermined list of category designations from category designations found in prior messages.

6. The method of claim 1, further comprising the steps of:
   assigning the at least one group designation to the message, the at least one group designation selected from a predetermined list of valid group designations; and inserting the at least one group designation to the message body prior to the step of posting the message.

7. The method of claim 1, wherein the category list of one user is independent from a category list of another user in that the category lists are not required to be identical.

8. The method of claim 1, wherein the at least one group designation is inserted into the header of the message.

9. The method of claim 1, wherein the at least one group designation is inserted into the body of the message.

10. The method of claim 1, further comprising a step of assigning additional category designations to the message.

11. The method of claim 10, wherein at least one of the additional category designations describes a geographic location of the poster.

12. The method of claim 10, wherein at least one of the additional category designations describes an attribute of the poster which is independent of the content of the message.

\* \* \* \* \*